Figure 1:
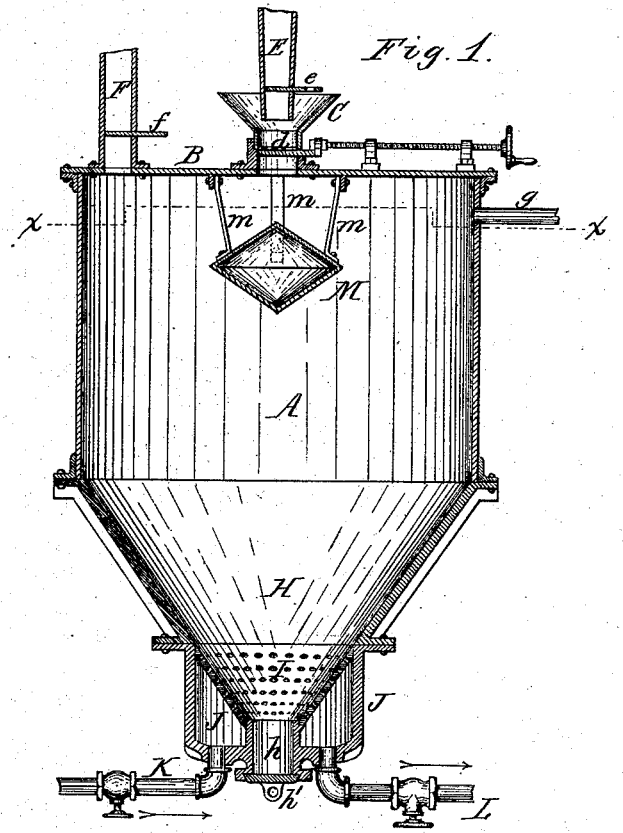

(No Model.)

T. A. & W. T. JEBB.
Method of and Apparatus for Steeping Grain.

No. 240,907.  Patented May 3, 1881.

Witnesses:
Chas. J. Buchheit
Edw. J. Brady

Thomas A. Jebb
William T. Jebb, Inventors
By Wilhelm & Bonner
Attorneys.

UNITED STATES PATENT OFFICE.

THOMAS A. JEBB AND WILLIAM T. JEBB, OF BUFFALO, NEW YORK.

METHOD OF AND APPARATUS FOR STEEPING GRAIN.

SPECIFICATION forming part of Letters Patent No. 240,907, dated May 3, 1881.

Application filed January 20, 1881. (No model.)

*To all whom it may concern:*

Be it known that we, THOMAS A. JEBB and WILLIAM T. JEBB, of the city of Buffalo, in the county of Erie, in the State of New York, have invented a new and useful Improvement in Methods of and Apparatus for Steeping Grain, of which the following is a specification, reference being had to the accompanying drawings.

This invention relates more particularly to the construction of a tank or vat for steeping Indian corn and other grains which are used in the manufacture of starch and for other industrial purposes, and to a method of steeping the same.

When Indian corn is heated to or above a temperature of about 155° Fahrenheit the starch-cells burst, and when such overheated corn is ground, crushed, or otherwise treated with water the contents of the cells remain suspended in the water and cannot be separated from the same by any known method. It is therefore important that the corn should not be subjected to such an injurious temperature; but as it is desirable to heat the corn to a temperature of about 125° Fahrenheit in steeping it, it is somewhat difficult to heat the corn properly without overheating the same.

Heretofore the steeping-vats have generally been provided with perforated pipes, through which steam is admitted to the vats, or with steam-coils; but this is objectionable, for the reason that in order to properly heat the corn which lies more remote from the steam jets or coils the corn lying in the immediate vicinity of the steam jets or coils becomes overheated or boiled. The overheated corn is not only spoiled for the manufacture of starch, but the gluten contained in this overheated corn becomes so sticky that it interferes with the subsequent separation of the gluten and other foreign matter from the starch, and when the starch is used in the manufacture of grape-sugar or glucose the gluten from this overheated corn clogs up the filters and causes various other inconveniences.

The object of this invention is to remedy these difficulties; and it consists, first, in the hereinafter-described method of steeping the grain; also, of a steeping-tank provided with a water-supply passage for the admission of the water, an overflow, whereby the water charged with impurities is permitted to escape, and a spreading device, whereby the grain is delivered in a shower or spray, thereby causing the grain to be washed as it passes through the water; also, in providing the steeping-tank with a closed cover and an escape-pipe, through which the vapor is conducted out of the building; and, finally, of the combination of the several appliances which enter into the construction of our improved steeping-tank, as will be hereinafter fully described.

Figure 2:
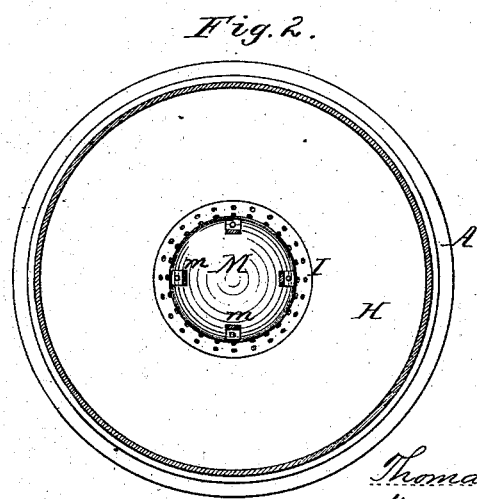

In the accompanying drawings, Figure 1 is a sectional elevation of our improved apparatus, and Fig. 2 is a horizontal section in line *x x*, Fig. 1.

Like letters of reference refer to like parts in both figures.

A represents the shell or body of the steeping-vat, which may be of cylindrical or other suitable form; and B is a tight cover, which closes the upper end of the shell A.

C is the feed-spout through which the grain is introduced into the vat A, and which is located in the center of the cover B, and provided with a valve, *d*, by which it can be opened and closed.

E is the discharge-spout of the grain-bin, located above the steeping-tank. It is provided with a suitable slide, *e*, whereby the flow of grain is regulated or arrested at desire.

F is a vapor-escape pipe rising from the cover B and extending outside of the building, and *f* is a slide or valve arranged in the escape-pipe F.

*g* is an overflow-pipe leading from the side of the shell A, near its top, to a convenient drain.

H represents the bottom of the steeping-vat, made in the form of an inverted cone, and terminating in a central discharge-spout, *h*, which is provided with a gate or valve, *h'*. The lower portion, I, of the bottom H is perforated and surrounded by a chamber, J, with which are connected two pipes, K and L. The pipe K serves for introducing water into the tank, and the pipe L for withdrawing it therefrom.

M represents a spreader arranged in the upper portion of the tank A, underneath the feed-spout C, and made preferably in the form of a cone. It is supported by arms *m*, or by other suitable means.

The tank is partially filled with water having a temperature of about 140° Fahrenheit, through the pipe K, from a reservoir located at a suitable height. The corn to be steeped is then gradually introduced into the tank, whereby the temperature of the water is lowered about 15°. The corn or other grain in entering the tank is distributed by the spreader M, so that the kernels reach the water singly near the shell of the tank. In descending through the water the kernels are washed, and such foreign matter as dust, chaff, &c., which adheres to the kernels or is mixed with the same is thereby detached from the kernels. The shower of grain which strikes the surface of the water near the wall of the tank drives the foreign matter which floats on the surface toward the center, where it accumulates until the water-level reaches the overflow-pipe $g$, through which the upper stratum of water, which is charged with the foreign matter, escapes to the drain. The temperature of the water is maintained at about 125° Fahrenheit by removing the water as often as may be necessary, the fresh water entering the tank through the pipe K and expelling the water in the tank through the overflow-pipe $g$. Indian corn is steeped in this manner for a period of about forty-eight hours. When this operation is completed the contents of the tank are permitted to cool, and the vapor is allowed to escape through the pipe F. When the contents of the tub are sufficiently cooled the water is drawn off through the waste-pipe L, and when this is accomplished the grain is drawn off through the discharge-spout $h$.

The chamber J and the perforated lower portion, I, of the bottom serve to distribute the incoming warm water uniformly over the entire width of the tank. As the latter is closed no vapor or steam can escape into the building, and the speedy destruction of the timbers by rotting, which takes place in factories employing open steeps, is thereby prevented.

In our improved steeping apparatus the separation of the impurities from the grain takes place while the grain is introduced into the steeping-tank, and the employment of separate machines for this purpose is thereby rendered unnecessary. The conical bottom of the tank permits the full and free discharge of the steeped grain, and dispenses with manual labor for the purpose of removing the grain from the tank.

We claim as our invention—

1. The hereinbefore-described method of steeping grain, which consists in first charging the steeping-tank with heated water, then introducing the grain into the water in the form of a spray, whereby the temperature of the mixture is reduced to the proper point, and in maintaining the desired temperature in the steeping-tank by replacing the water in the tank from time to time by fresh water previously heated to the desired point, substantially as set forth.

2. A steeping-tank provided with appliances for admitting water thereto and permitting the overflow of the excess of water, and a spreader, whereby the grain entering the tank is distributed in a spray or shower, substantially as set forth.

3. A closed steeping-tank provided with appliances for admitting water thereto and permitting the overflow of the excess of water, a spreader, whereby the grain entering the tank is distributed in a spray or shower, and a vapor-escape pipe, substantially as set forth.

4. A closed steeping-tank provided with a grain-spout, C, a spreader, M, a conical bottom, H, water inlet and outlet pipes K and L, and an overflow-pipe, $g$, substantially as set forth.

THOMAS A. JEBB.
WILLIAM T. JEBB.

Witnesses:
JNO. J. BONNER,
EDWARD WILHELM.